United States Patent [19]

Lehmann et al.

[11] 4,218,905
[45] Aug. 26, 1980

[54] ROLLING MILL

[75] Inventors: Rolf Lehmann, Rudolfstetten, Switzerland; Wolf-Gunter Stotz, Ravensburg, Fed. Rep. of Germany

[73] Assignee: Escher Wyss Limited, Zurich, Switzerland

[21] Appl. No.: 847,601

[22] Filed: Nov. 1, 1977

[30] Foreign Application Priority Data

Nov. 2, 1976 [CH] Switzerland ............... 13783/76

[51] Int. Cl.² .................. B21B 37/00; B21B 13/14; B21B 29/00
[52] U.S. Cl. ....................... 72/21; 72/241; 72/245; 72/232
[58] Field of Search ............. 72/241, 243, 245, 237, 72/249, 21, 34, 19

[56] References Cited

U.S. PATENT DOCUMENTS

| | | | |
|---|---|---|---|
| 2,040,543 | 5/1976 | Beatty | 72/250 |
| 2,696,698 | 12/1954 | Davison | 72/200 X |
| 2,985,042 | 5/1961 | Talbot | 72/243 |
| 3,018,676 | 1/1962 | Polakowski | 72/21 |
| 3,172,313 | 3/1965 | Fox | 72/241 |
| 3,461,704 | 8/1969 | Rastelli | 72/242 |
| 3,726,338 | 4/1973 | Sorenson | 165/89 |
| 3,802,044 | 4/1974 | Spillmann et al. | 27/113 AD |
| 3,885,283 | 5/1975 | Biondetti | 29/116 AD |
| 4,041,752 | 8/1977 | Dolenc et al. | 72/241 |
| 4,059,976 | 11/1977 | Christ et al. | 72/241 |

FOREIGN PATENT DOCUMENTS

| | | |
|---|---|---|
| 257517 | 10/1967 | Austria. |
| 940162 | 3/1956 | Fed. Rep. of Germany. |
| 2165118 | 7/1972 | Fed. Rep. of Germany. |
| 802459 | 10/1958 | United Kingdom. |

*Primary Examiner*—Milton S. Mehr
*Attorney, Agent, or Firm*—Pennie & Edmonds

[57] ABSTRACT

A rolling mill is disclosed wherein at least two drive rolls are mounted for rotation within a frame, with each drive roll being rotatably supported by at least one backing roll and at least one working roll is mounted for rotation between the drive rolls to define at least one path for passage of material to be rolled. While each working roll is freely rotating, it is rotatably driven by surface friction produced by engagement with at least one of the drive rolls. Each working roll has a diameter less than the diameter of the drive rolls and the mounting position is such that the rotational axis of each working roll is substantially in the same working plane as the rotational axis of the drive rolls while lateral support devices, preferably in the form of hydraulic medium operated piston members, act in engagement with the surface of each working roll to prevent movements of the working roll out of the working plane. In a preferred embodiment two working rolls are provided and define one material rolling path, while lateral support devices are provided to maintain the aligned position of the drive rolls as well as each working roll.

29 Claims, 7 Drawing Figures

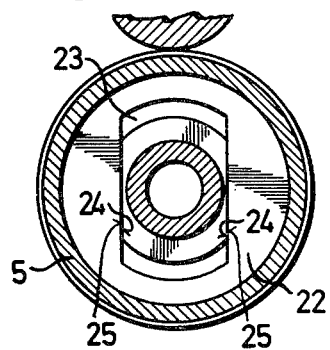
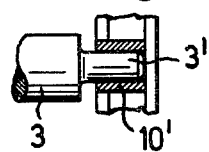
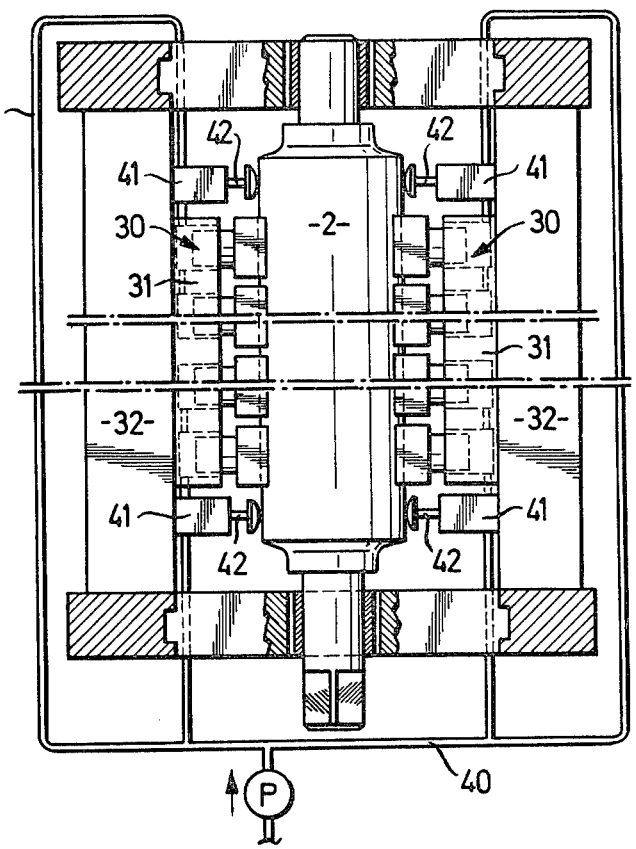
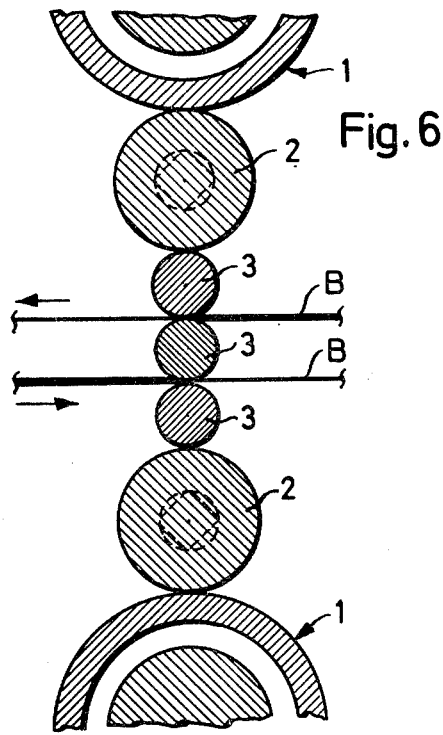
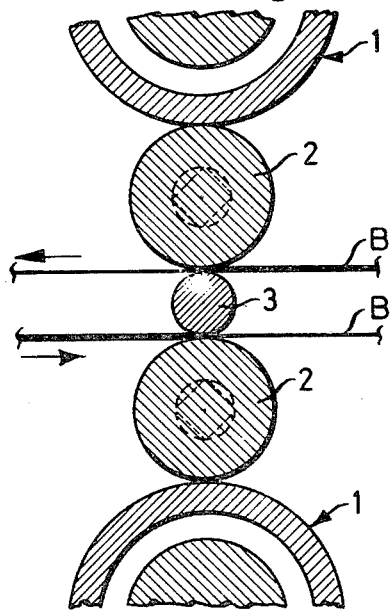

ROLLING MILL

BACKGROUND OF THE INVENTION

1. Field of the Invention

This invention relates to a rolling mill of the type having two drive rolls between which at least one rolling path is provided for the passage of the material to be rolled, with each drive roll being supported by at least one backing roll.

2. Description of the Prior Art

Rolling mills (or roll stands) of the type contemplated herein are particularly suitable for rolling metal foils and webs of similar material. One example of a rolling mill which accomplishes the rolling objective with less weight and complexity than previously known mills is described in commonly assigned U.S. patent application Ser. No. 655,767, filed Feb. 6, 1976. In this mill, backing rolls are provided for the working rolls, each backing roll being provided with a rotatable barrel (or roll shell) which is hydrostatically supported on a stationary member in a manner somewhat similar to the technique utilized for controlled deflection rolls. The deflection due to the load is taken solely by the backing roll support members with the result that the roll barrels are practically free from deflection, sag or flexure. The great number of backing rolls which otherwise may be required are thus avoided, while those backing rolls actually provided need not be dimensioned for strength, but rather they are dimensioned to undergo a minimum of deflection.

In such rolling mills, the web of material to be rolled generally passes directly between the two drive rolls which are connected to a drive mechanism, and the drive rolls thus roll the material directly. Consequently, the drive rolls must have relatively large diameters in order to enable them to withstand the necessary torque requirements for rolling. Thus, it will be seen that relatively large forces and torques are generated and transmitted during the material rolling process. We have invented a rolling mill in which the rolling forces and the torques of the drive rolls are further reduced, thereby providing an even further simplification of the rolling mill. Further, it will be seen that if the dimensions of our inventive rolling mill components remain unchanged from the earlier developments, our present rolling mill will provide an even greater reliability and accuracy in the rolling operation.

SUMMARY OF THE INVENTION

A rolling mill is provided which comprises at least two drive rolls mounted for rotation, each drive roll being rotatably supported by at least one backing roll, and at least one working roll mounted for rotation between the drive rolls and defining a path for passage of material to be rolled. The working roll is rotatably driven by engagement with at least one of the drive rolls and the working roll has a diameter less than the diameter of the drive rolls. Further, the drive rolls and the working rolls are mounted such that the axes of rotation are substantially in the same working plane and at least one working roll is provided with lateral support devices which act in engagement with the surface of the roll to prevent the working roll from moving out of the working plane.

In the preferred form, the rolling mill according to the invention comprises a frame, at least two drive rolls mounted for rotation in the frame, and at least one backing roll mounted for rotatable engagement with each drive roll to rotatably support the drive roll. At least one working roll is mounted for rotation between the drive rolls, and for rotational engagement with at least one of the drive rolls so as to be driven by surface friction between the respective engaged surfaces thereof. Each working roll has a diameter less than the diameter of the drive rolls and is mounted such that the rotation axis of each working roll is substantially within the same working plane as the rotational axes of the drive rolls. At least two support devices are positioned in adjacent engagement with the surface of each working roll to provide lateral support forces for each working roll, the forces being in a direction to prevent movements of the working roll out of the working plane.

The working roll does not have a direct drive and is driven solely by frictional forces of the associated drive roll. Thus, the working roll may be of relatively small diameter, and therefore requires much less contact-pressure and drive forces than the forces which would otherwise be required if the drive roll is used directly for rolling. However, the diameter of the drive roll has a bottom limit because of the torque required for transmission of the necessary rolling forces.

In known rolling mills such as those commonly referred to as "Sendzimir Roll Stands" it was necessary to guide the working roll or rolls by a plurality of rolls positioned in adjacent relation or in engagement with the working roll or rolls. In the present inventive construction, complexity is further avoided by the provision of lateral support devices which prevent the working roll from moving out of the working plane, thereby obviating the necessity for additional supporting rolls. In addition, in the preferred construction, the drive rolls are supported laterally by such support devices to further obviate support rolls for the drive rolls.

Preferably, two working rolls may be disposed between the drive rolls, with the rolling path between the working rolls. An embodiment of this type is thus particularly suitable for rolling the web in a single direction.

Alternatively, three working rolls may be disposed between the drive rolls, there being two rolling paths between the working rolls. A rolling mill of this type is suitable for rolling two materials in two different directions without reversing the direction of rotation of the rolls. Preferably, each drive roll may be supported by a backing roll, the respective axes of the backing rolls, the drive rolls, and the working rolls all being substantially in the same plane. Such a construction provides a rolling mill of greater efficiency and significantly lesser complexity, while it does not preclude the possibility of supporting one or more of the drive rolls by two or more backing rolls for specific purposes.

In another embodiment, a single working roll is provided between the drive rolls, there being a rolling path between each drive roll and the working roll. This arrangement provides dual rolling directions while significantly avoiding the complex prior art constructions in which this objective was sought. However, it should be noted that with such an arrangement it is not possible to achieve minimum rolling forces.

Preferably, the backing rolls are constructed in the form of a roll shell positioned for rotation about a fixed support beam. Hydrostatic support elements in the form of either pistons or elongated strips are provided in arrangements somewhat similar to the construction disclosed in commonly assigned U.S. Pat. No. 3,802,044 to Spillmann et al., wherein a hydraulic pressure medium is operative within a pressure chamber to provide outward forces against the roll shell via the pistons or strips, while maintaining the roll shell in rotatable spaced relation about the fixed support beam. The pistons or strips include hydrostatic bearing pockets at the end portion facing the inner surface of the roll shell so as to receive the pressure medium directed thereto from the pressure chamber. This constructional arrangement provides extremely low friction operation with very significant loading of the backing rolls, while simultaneously eliminating any adverse effects which would otherwise be caused by deflection of the rolls.

The working rolls and/or the drive rolls may be supported transversely of the direction of their pressure on external hydrostatic support elements in the form of pistons or strips. These support elements are pressed outwardly against the supported roll by a hydraulic pressure medium acting in the pressure chambers. The pistons or strips—as the case may be—have bearing pockets for the hydrostatic mounting on their surfaces facing the surface of the support roll. It will be seen that this embodiment provides and extremely low-friction operation for the rolling mill, while the hydraulic medium emerging from the bearing pockets may be additionally utilized for cooling and lubricating the rolls and the rolled web.

Preferably, the bearing pockets in the hydrostatic support elements are connected to the pressure chamber by throttle ducts. With such a construction the hydraulic pressure medium may simultaneously be used as a lubricant for the hydrostatic mounting.

Control valves may be provided to influence the pressure of the hydraulic pressure medium operative in the pressure chambers. These control valves are of the type which are specifically adapted to operate in dependence on the position of the associated working roll so as to enable the position of the working rolls and/or the drive rolls to be accurately fixed in the region of the pressing plane. Consequently, the journals of the drive rolls are relieved of lateral guidance forces so that the mechanical stresses in the rolls are reduced, with one exemplary result being that the rolls may be subjected to higher torque loads. It should be noted that it is quite possible to completely dispense with guide journals at the ends of the working rolls, thereby providing, on the one hand, still lesser complexity of the inventive rolling mill and, on the other hand, enabling the working rolls to be operative with still smaller diameters since there is no risk of their lateral bending which would otherwise have been provided by the guidance forces of the end journals.

In the preferred embodiment, the working rolls are guided in the direction transversely of the pressing plane solely by the external hydrostatic support elements. Further, these rolls are guided axially by stop members which limit their axial movements. As will be seen, this arrangement provides reduction of the loading of the working rolls, while avoiding the relatively complex constructions of the prior art.

BRIEF DESCRIPTION OF THE DRAWINGS

Preferred embodiments of the invention are described hereinbelow with reference to the drawings wherein:

FIG. 3 is a cross-sectional view taken along lines III—III of FIG. 2;

FIG. 4 is a view partially in cross-section illustrating an alternate embodiment of the invention utilizing a different mounting arrangement for the ends of the working rolls;

FIG. 5 is a view partially in cross-section, taken along lines V—V of FIG. 1; and FIGS. 6 and 7 illustrate alternate embodiments of the invention utilizing a different number of working rolls.

DETAILED DESCRIPTION OF THE PREFERRED EMBODIMENTS

Figure 1:
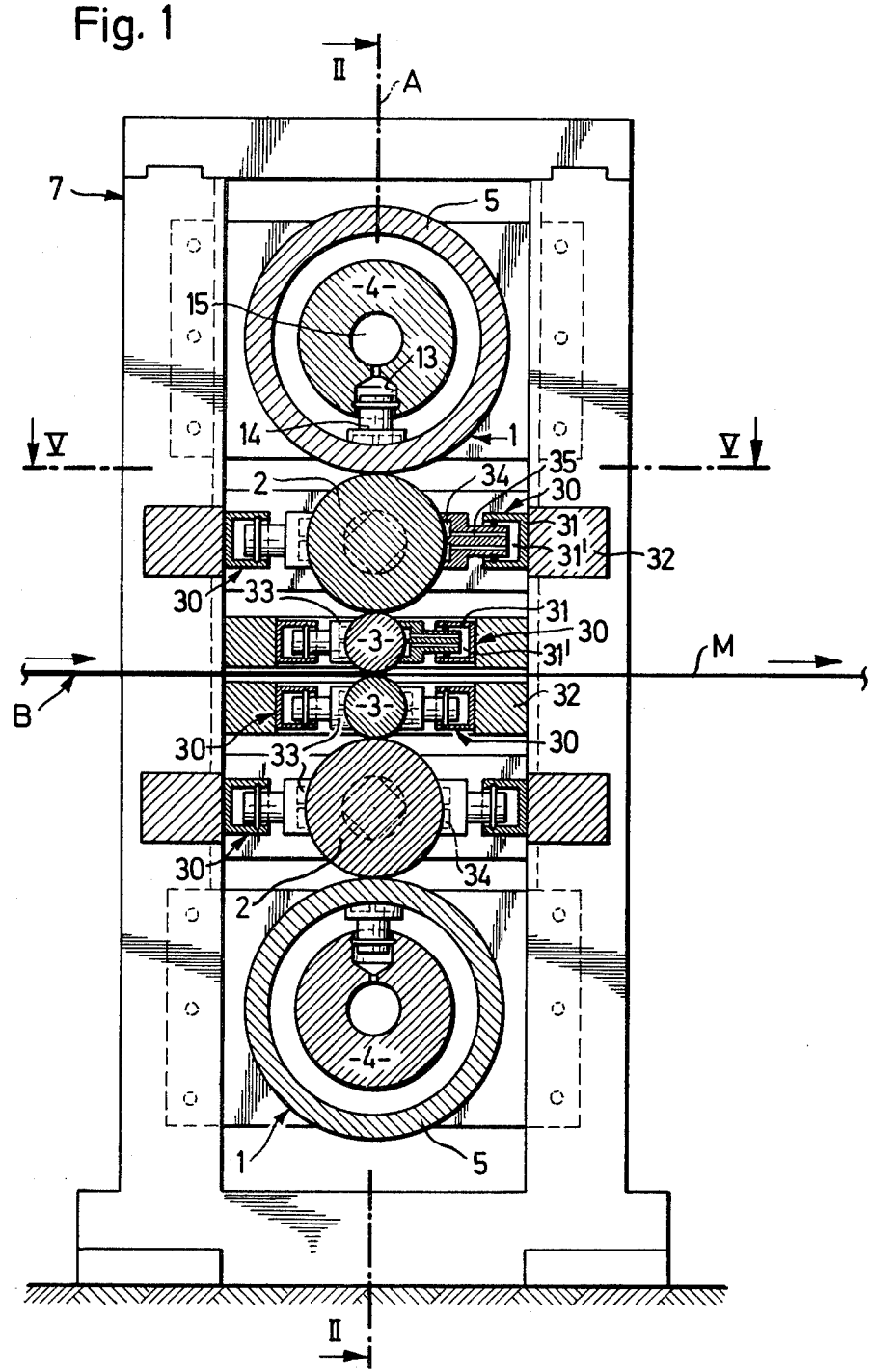
FIG. 1 is a section of a rolling mill constructed according to the invention wherein two working rolls are powered with two drive rolls and two backing rolls.
Figure 2:
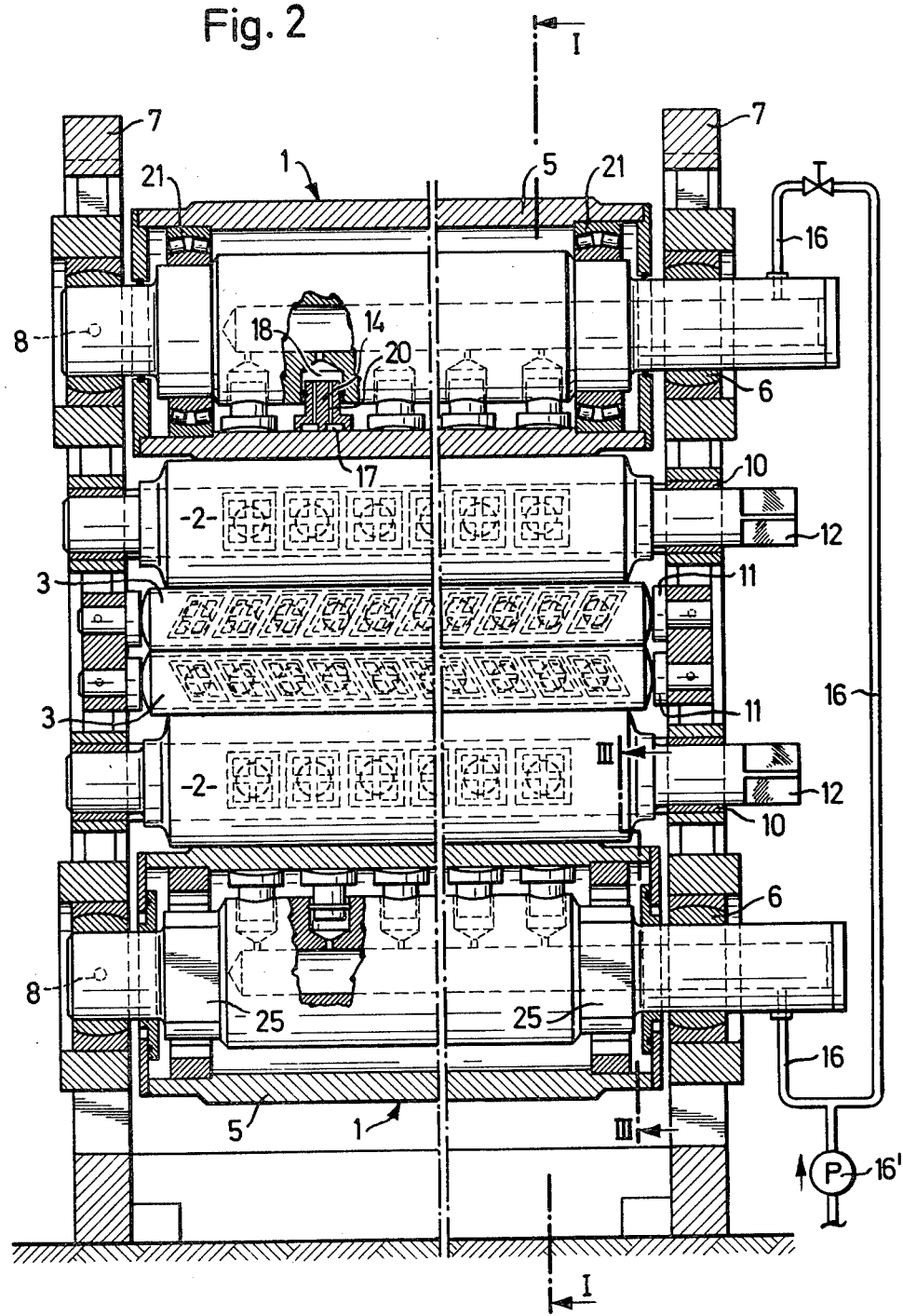
FIG. 2 is a cross-sectional view taken along lines II—II of FIG. 1.

FIGS. 1 and 2 illustrate a rolling mill having frame 7, two backing rolls 1, two drive rolls 2 and two working rolls 3. The backing rolls 1 comprise stationary members 4 about which tubular roll barrels 5 are rotatably mounted. As will be apparent from FIG. 2, members 4 are pivotally mounted in a frame 7 by means of ball cups 6. Studs 8 prevent the members 4 from rotating with respect to the frame 7. The drive rolls 2 are mounted by their journals in bearings 10 which are guided for vertical movement in the frame 7. In the embodiment shown in FIGS. 1 and 2, the working rolls 3 have no journals and bear axially against stop members such as support plates 11 fixed in the frame 7. As will also be seen from FIG. 2, the drive rolls 2 have drive ends 12 with operative ends for drive shafts (not shown) which may be provided with universal joints, for example, in known manner.

As will further be seen from FIGS. 1 and 2, hydrostatic support pistons 14 are guided in suitable bores 13 in the members 4. Bores 13 are connected to a common connecting duct 15 formed in the region of the axis of the member 4 and adapted to receive a hydraulic pressure medium, e.g. pressure oil, from a pump 16' via a feed pipe 16.

The invention utilizes a roll construction similar in some respects to the roll construction and operational arrangement illustrated and described in commonly assigned U.S. Pat. No. 3,802,044 to Spillmann et al., to which reference may be made with respect to the operation of the present rolling mill. As shown in section in FIG. 2 the pistons 14 are provided with hydrostatic bearing pockets 17 communicating with the pressure chamber 18 of bores 13 via throttle ducts 20. For the present arrangement it is significant to note that the barrels 5 of the two rolls 1 are hydrostatically borne and mounted on the support pistons 14, and any sag or flexure of these rolls as taken by the members 4, while the members 4 are maintained in spaced relation with the roll barrels or shells 5.

Although the support elements 14 are in the form of pistons in the example illustrated, it should be understood that they may alternatively be of elongate construction, as for example in the form of strips. Further, it is not a necessary condition to the practice of the invention to mount the roll barrel 5 hydrostatically on the support elements 14. For example, rolls with hydrodynamic lubrication or solid rolls in accordance with German patent publication No. DT OS 21 65 118 may be utilized as well.

The upper and lower backing rolls 1 are mounted in a manner somewhat similar to the rolls disclosed in commonly assigned U.S. Pat. No. 3,885,283 to Biondetti. As shown in FIG. 2, in the case of the upper backing roll 1, barrel 5 is mounted rotatably on the member 4 in rolling bearings 21. The bottom backing roll 1 includes guides at its ends as shown in FIG. 3. For this roll, a guide disc 22 is disposed rotatably in the barrel 5 and has an elongate aperture 23 with two lateral plane guide faces 24 which cooperate with plane guide faces 25 on the member 4. This structural arrangement allows movement of the roll barrels 5 with respect to the members 4 in the direction of the pressing plane so that there is no need for separate external contact-pressure means in the roll system.

As will be clear particularly from FIGS. 1 and 2, the working rolls 2 are borne by lateral supporting devices 30 which act in the direction perpendicular to the pressing plane "A" as shown. Such supporting devices prevent the drive rolls 3 from moving out of the pressing plane or their rolling position. The reason for this arrangement is that it is possible, in principle, to shift drive rolls 2 slightly (and particularly the working rolls 3) out of the pressing plane "A" to obtain special effects, with the result that lateral force components are obtained which may be advantageously utilized in certain cases.

Lateral supporting devices 30 are constructed in a manner somewhat similar to the devices described in commonly assigned U.S. Pat. No. 4,041,752 to Dolenc et al. and U.S. Application Ser. No. 655,767, filed Feb. 6, 1976. As will be apparent from FIGS. 1 and 5, the lateral supporting devices 30 are provided with strips 31 fixed to members 32 of the frame 7. The strips 31 are formed with bores 32 in which support pistons 33 are guided. These pistons 33 have hydrostatic bearing pockets 34 and throttle ducts 35 and act in the same way as the support pistons 14 of the rolls 1.

FIG. 5 illustrates a means of controlling the supply of pressure medium to the lateral support devices 30 for the drive rolls 2. The pressure medium is fed through feed ducts 40 via control valves 41 to the individual pressure chambers of the bores of the strips 31. The latter contain sensors 42 which sense the position of the ends of the associated roll 2. As the roll 2 moves away from its predetermined position in either direction, the pressure is reduced or increased by the corresponding throttle device 41 so that the roll 2 is returned to its required position. The same control system can be applied to the working rolls 3. The pressure medium for the working rolls may be a fluid which is also suitable for lubricating the working rolls during the rolling operation as paraffin, for example. The rolls are simultaneously intensively cooled by the hydraulic medium emerging from the hydrostatic bearing pockets 34 provided that this medium is supplied at a suitable low temperature. To this end, a cooler (not shown) may be included in the hydraulic pressure medium circuit.

FIG. 4 illustrates an embodiment in which the working rolls 3 has journals 3' at their ends, said journals being guided in slides 10' which are also vertically movable. Finally, FIGS. 6 and 7 show rolling mills in which three working rolls are provided in one case and a single working roll in the other.

In the embodiment illustrated in FIG. 6, three working rolls 3 are provided between two drive rolls 2. The lateral support devices, which may be of the same type as shown in FIGS. 1 and 2, have been omitted for the sake of clarity.

The rolling mill according to FIG. 1 has a single rolling path "B" along which the rolled material M is moved while the embodiment shown in FIG. 6 defines two rolling paths "B". The material can be rolled in different directions in the two paths B as shown by the direction of the arrows in FIG. 6. Further, the material may simultaneously be moved to and fro without reversing the direction of rotation of the actual rolling mill.

FIG. 7 illustrates an embodiment of the inventive rolling mill in which a single working roll 3 is utilized. Two rolling paths are again provided, however, they are situated in each case between a drive roll 2 and the working roll 3. In this embodiment the same effect as in the embodiment shown in FIG. 6 is provided with less complexity. However, in this arrangement there is no optimum reduction of the rolling forces, since it is not only the small diameter working roll 3 which is taking part in the roll pass, but the drive rolls 2 as well, whose diameter must necessarily be greater.

In the present arrangement it may be helpful to provide examples of relative sizes of the various rolls. For example, in a rolling mill constructed according to the invention, the working roll diameters may be between 20 and 200 mm, while corresponding diameters of the drive rolls may be about 50 to 300 mm. Of course, embodiments with smaller and larger diameters are also possible within the scope and spirit of the invention.

We claim:
1. A rolling mill which comprises:
   (a) a frame;
   (b) at least two drive rolls mounted for rotation in said frame;
   (c) at least one backing roll mounted for rotatable engagement with each drive roll to rotatably support said drive rolls;
   (d) at least one working roll mounted for rotation between said drive rolls and for rotational engagement with at least one of said drive rolls so as to be driven by surface friction between the respective engaged surfaces thereof, said at least one working roll having a diameter less than the diameter of said drive rolls and mounted such that the rotational axis of said at least one working roll is substantially within the same working plane as the rotational axes of said drive rolls;
   (e) at least two hydrostatic lateral support devices positioned in engagement with the surface of said at least one working roll to provide lateral support forces for said at least one working roll, said forces being in a direction to prevent unwanted movements of said at least one working roll with respect to said working plane;
   (f) sensing devices in direct physical contact with a surface of said at least one working roll to sense the position of said at least one working roll;
   (g) a valve device in combination with each sensing device and directly actuated thereby to control the pressure of the hydraulic pressure medium directed to said hydrostatic lateral support devices and to operate in dependence upon the position of said at least one working roll with respect to said working plane sensed by said associated sensing device so as to maintain the position of said at least one working roll in a predetermined relation relative to said working plane.

2. The rolling mill according to claim 1, wherein at least two working rolls are mounted for free rotation between said drive rolls, said working rolls defining a material rolling path therebetween.

3. The rolling mill according to claim 2, wherein each drive roll is supported in engagement with a backing roll and said rolls are mounted for rotation such that the rotational axes of said backing rolls and said drive rolls and said working rolls are substantially within the same plane.

4. The rolling mill according to claim 1, wherein at least three working rolls are mounted for free rotation between said drive rolls, said working rolls being in rolling contact so as to define two material rolling paths therebetween.

5. The rolling mill according to claim 4, wherein each drive roll is supported in engagement with a backing roll and said rolls are mounted for rotation such that the rotational axes of said backing rolls and said drive rolls and said working rolls are substantially within the same plane.

6. The rolling mill according to claim 1, wherein at least one working roll is mounted for engaged rotation with said drive rolls, said working rolls defining a material rolling path between each drive roll and said working roll.

7. The rolling mill according to claim 6, wherein each drive roll is supported in engagement with a backing roll and said rolls are mounted for rotation such that the rotational axes of said backing rolls and said drive rolls and said working rolls are substantially within the same plane.

8. The rolling mill according to claim 6, wherein said working rolls are guided in the direction transversely of the pressing direction solely by external hydrostatic support elements and are guided axially by stop members.

9. The rolling mill according to claim 1, wherein each drive roll is supported in engagement with a backing roll and said rolls are mounted for rotation such that the rotational axes of said backing rolls and said drive rolls and said working rolls are substantially within the same plane.

10. The rolling mill according to claim 1, wherein each of said backing rolls is comprised of a roll shell positioned about a fixed support beam and a plurality of hydrostatic support elements are positioned therebetween, said hydrostatic support elements communicating with a source of hydraulic pressure medium to provide support forces between said fixed support beam and said roll shell.

11. The rolling mill according to claim 10, wherein each hydrostatic support element comprises a piston member positioned for guided motion within a cylinder, each piston member having hydrostatic bearing pockets formed at the end portion facing the inner surface of said roll shell so as to permit said roll shell to rotate about said fixed support beam while providing hydrostatic support forces thereagainst.

12. The rolling mill according to claim 11, wherein each of said hydrostatic support elements communicates with a source of hydrostatic pressure medium to provide support forces between said fixed support beam and said roll shell.

13. The rolling mill according to claim 1, wherein each of said backing rolls is comprised of a roll shell positioned for rotation about a fixed support beam and hydraulic support elements are positioned therebetween to provide outward support forces between said fixed support beam and said roll shell, each hydraulic support element being in the form of a strip having a plurality of hydraulically operable members positioned for guided motion within a stationary member positioned between said fixed support beam and said roll shell.

14. The rolling mill according to claim 13, wherein each hydraulically operable member of each strip is configured as a piston member having hydrostatic bearing pockets at one end facing the interior surface of said roll shell so as to provide rotatable hydrostatic support for said roll shell.

15. The rolling mill according to claim 13, wherein said working rolls are guided in the direction transversely of the pressing direction solely by external hydrostatic support elements and are guided axially by stop members.

16. The rolling mill according to claim 1, wherein said working rolls are supported by hydraulic support means in a direction transverse of the direction of pressure provided by said working rolls.

17. The rolling mill according to claim 16, wherein said hydraulic support means comprises hydrostatic support means having a plurality of pressure chambers and a plurality of hydrostatic piston members facing said working rolls in a direction transverse of the direction of pressure provided by said rolls, each of said hydrostatic piston members being provided with bearing pockets facing the surface of the associated working roll for supporting said working roll in hydrostatic rotational relation.

18. The rolling mill according to claim 17, wherein said bearing pockets are connected to a hydraulic pressure chamber on the opposite end of said piston member by throttling ducts.

19. The rolling mill according to claim 18, wherein said drive rolls are supported by hydraulic support means in a direction transverse of the direction of pressure provided by said drive rolls.

20. The rolling mill according to claim 19, wherein said hydraulic support means comprises hydrostatic support means having a plurality of pressure chambers and a plurality of hydrostatic piston members facing said drive rolls in a direction transverse of the direction of pressure provided by said drive rolls, each of said hydrostatic piston members being provided with bearing pockets facing the surface of the associated drive roll for supporting said drive roll in a hydrostatic rotational relation.

21. The rolling mill according to claim 20, wherein said bearing pockets are connected to a hydraulic pressure chamber on the opposite end of each piston member by throttling ducts.

22. The rolling mill according to claim 16, wherein said working rolls are guided in the direction transversely of the pressing direction solely by external hydrostatic support elements and are guided axially by stop members.

23. The rolling mill according to claim 1, wherein said working rolls are supported by hyraulic means in the form of hydraulically operable strips positioned for guided motion against said working rolls.

24. The rolling mill according to claim 23, wherein each hydraulically operable strip includes a plurality of hydrostatically operable piston members positioned for guided motion within stationary members and having bearing pockets at the end portions facing said working rolls.

25. The rolling mill according to claim 23, wherein each hydraulically operable strip includes a plurality of hydrostatically operable piston members positioned for guided motion within stationary members and having bearing pockets at the end portions facing said drive rolls.

26. The rolling mill according to claim 1, wherein said drive rolls are supported by hydraulic means in the form of hydraulically operable strips positioned for guided motion against said drive rolls.

27. The rolling mill according to claim 26, wherein said working rolls are guided in the direction transversely of the pressing direction solely by external hydrostatic support elements and are guided axially by stop members.

28. The rolling mill according to claim 1, wherein said working rolls are guided in the direction transversely of the pressing direction solely by external hydrostatic support elements and are guided axially by stop members.

29. A rolling mill which comprises:
(a) a frame;
(b) at least two drive rolls mounted for rotation in said frame;
(c) at least one backing roll mounted for rotatable engagement with each drive roll to rotatably support said drive rolls;
(d) at least one working roll mounted for rotation between said drive rolls and for rotational engagement with at least one of said drive rolls so as to be driven by surface friction between the respective engaged surfaces thereof, each working roll having a diameter less than the diameter of said drive rolls and mounted such that the rotational axis of each working roll is substantially in a predetermined relation with respect to said working plane;
(e) at least two hydrostatic lateral support devices positioned in engagement with a surface of at least one of said rolls to provide lateral support forces for said at least one roll, said forces being in a direction to prevent unwanted movements of said roll with respect to said working plane;
(f) sensing devices in direct physical contact with a surface of said at least one roll to sense the position thereof; and
(g) a valve device in combination with each sensing device and directly actuated thereby to control the pressure of the hyraulic pressure medium directed to said hydrostatic lateral support devices and to operate in dependence upon the position of said at least one roll with respect to said working plane sensed by said associated sensing device so as to maintain the position of said at least one roll in a predetermined relation with respect to said working plane.

* * * * *